(12) United States Patent  
Avner et al.

(10) Patent No.: US 7,428,543 B2  
(45) Date of Patent: *Sep. 23, 2008

(54) METHODS AND SYSTEMS FOR ALLOWING THIRD PARTY CLIENT APPLICATIONS TO INFLUENCE IMPLEMENTATION OF HIGH-LEVEL DOCUMENT COMMANDS

(75) Inventors: Jon B. Avner, Bellevue, WA (US); Soner F. Terek, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 298 days.

This patent is subject to a terminal disclaimer.

(21) Appl. No.: 11/305,382

(22) Filed: Dec. 16, 2005

(65) Prior Publication Data

US 2006/0106794 A1 May 18, 2006

Related U.S. Application Data

(63) Continuation of application No. 09/680,118, filed on Oct. 4, 2000, now Pat. No. 6,993,528.

(51) Int. Cl.  
*G06F 17/30* (2006.01)

(52) U.S. Cl. .................. 707/100; 707/3; 707/5; 707/10; 707/104.1

(58) Field of Classification Search ............ 707/5, 707/100, 104.1, 3, 10  
See application file for complete search history.

*Primary Examiner*—Apu Mofiz  
*Assistant Examiner*—Cindy Nguyen  
(74) *Attorney, Agent, or Firm*—Workman Nydegger

(57) ABSTRACT

A mechanism is described for allowing third party client applications to affect how high-level document commands are implemented in a database. After a high-level document command meeting certain criteria is received in a database management system, the system identifies one or more third party client application that are to be notified when such high-level document commands are received. The client applications are then notified allowing the client application to return implementation instructions which are used by the database management system in determining how to implement the high-level document command. The instruction may be to prevent implementation altogether, to somehow change the implementation, or even to perform high-level document commands in addition to the original high-level document command.

2 Claims, 4 Drawing Sheets

METHODS AND SYSTEMS FOR ALLOWING THIRD PARTY CLIENT APPLICATIONS TO INFLUENCE IMPLEMENTATION OF HIGH-LEVEL DOCUMENT COMMANDS

CROSS-REFERENCE TO RELATED APPLICATIONS

This application is a continuation of U.S. patent application Ser. No. 09/680,118, filed Oct. 4, 2000, and entitled "METHODS AND SYSTEMS FOR ALLOWING THIRD PARTY CLIENT APPLICATIONS TO INFLUENCE IMPLEMENTATION OF HIGH-LEVEL DOCUMENT COMMANDS" and which is incorporated herein by reference.

BACKGROUND OF THE INVENTION

1. The Field of the Invention

The present invention relates to the field of database management systems. In particular, the present invention relates to methods and systems for allowing third party client applications to have influence on how high-level document commands are implemented in a database.

2. The Prior State of the Art

With the development of computer networks and the Internet, anyone who has access to an Internet capable computer may access information from all over the world. The present era has even been termed the "information age" due to the widespread abundance of information. Although this abundance of information is useful, individuals may easily be overwhelmed with information to the point where it is difficult to filter out relevant information from irrelevant information.

Database management systems are systems that manage collections of data (i.e., databases) so as to allow individuals, devices and applications to easily access, manage, and update information. Thus, database management systems provide a significant contribution to the information age by allowing for the efficient use of information.

Conventional database management systems such as the database management system 100 shown in FIG. 1 include an underlying database 110 that contains organized data in the form of a number of tables such as table "A", table "B", table "C" and table "D". Each table contains entries that associate documents with property of the documents. For example, one table may contain a count of the number of files within given folders, another may list the memory size of given files, yet another may list other properties associated with given files, or folders. For each document, there is typically more than one table that may associated with the document by, for example, describing properties of the document.

A document (e.g., document 1, 2, 3 and 4 in FIG. 1) is an identifiable entity from the viewpoint of applications that use the database management system. For example, a folder or an item such as an electronic mail message within the folder may be considered to be a document since they are identified as entities from the viewpoint of the application that uses the database management system. For example, in the context of electronic messaging, an application may present folders such as "in-boxes" and "out-boxes" to a user with corresponding electronic mail messages in the folders. These folders and electronic mail messages are "documents" from the viewpoint of the application. Similarly, files and directories within a file system may also be documents from the viewpoint of the application that uses the database management system. The tables within the underlying database are not considered to be documents since they are identified internal to the database management system, and not at the higher level of the application that uses the database management system.

The database application 120 generates high-level document commands (e.g., high-level command 121) that relate to operations to be performed on a document. Examples of such document commands might include operations such as, for example, move folder, move message, delete message, copy folder, copy file, and so forth.

Each of these high-level document commands is received by the database engine 130 which implements the high-level document commands by executing a number of table level commands that result in database tables being updated. Typically, the database engine would use the disk access module 140 of an operating system to produce the physical control signals necessary to read and write the appropriate sectors in the disk, each table comprising one or more possibly discontiguous sectors on the disk.

Once the high-level document command is implemented, the database management system may notify other client applications using notification module 150 that the high-level document command was implemented. Then, the other client applications may perform a variety of processes in response to that notification. For example, if a new electronic mail messages is added into a public folder, the other client applications that have subscribed to that public folder may receive notification of the new electronic mail message so that they can update there local database to reflect the change, or perhaps refresh the screen if it is currently displaying the contents of the public folder.

In the conventional method, the notification is only dispatched after the high-level document command is implemented. There is nothing the client application can do to affect how the high-level document command is implemented, what additional actions are to be taken in the database at the same time the high-level document command is implemented, or whether the high-level document command is to be implemented at all. Therefore, what are desired are methods and systems for allowing more flexibility for a third party client application to affect how a high-level document command is implemented in a database.

SUMMARY OF THE INVENTION

The principles of the present invention provide for a way for third party client applications to influence how a high-level document command is implemented by a database management system. The database management system is issued a number of high level-document commands which are intended to be implemented in the underlying database. Such high-level document commands include high-level commands that relate to actions to be taken on documents such as folders, files, messages and other entities that are identified at the level of the application that uses the database management system. For example, in electronic messaging applications, one high-level document command may be to add a mail message to a folder.

Unlike conventional database management systems, however, the database management system in accordance with the invention temporarily foregoes implementing the high-level document command in the database. Instead, the database management system identifies any third party client applications that are to be notified when the high-level document command is received. Then, the database management system dispatches a notification. The client application is thus made aware of the notification so that the client application may return back implementation instructions on how to implement the high-level document command. The database management system receives the implementation instructions and follows the instructions in implementing the high-level document command.

For example, the instruction may be for preventing the implementation of the high-level document command altogether. The instruction may also be to change how the high-level document command is implemented. The instruction may even be for implementing one or more high-level document commands in addition to the received high-level document command. Thus, the notified third party client application is given extensive control over how the high-level document command is implemented.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
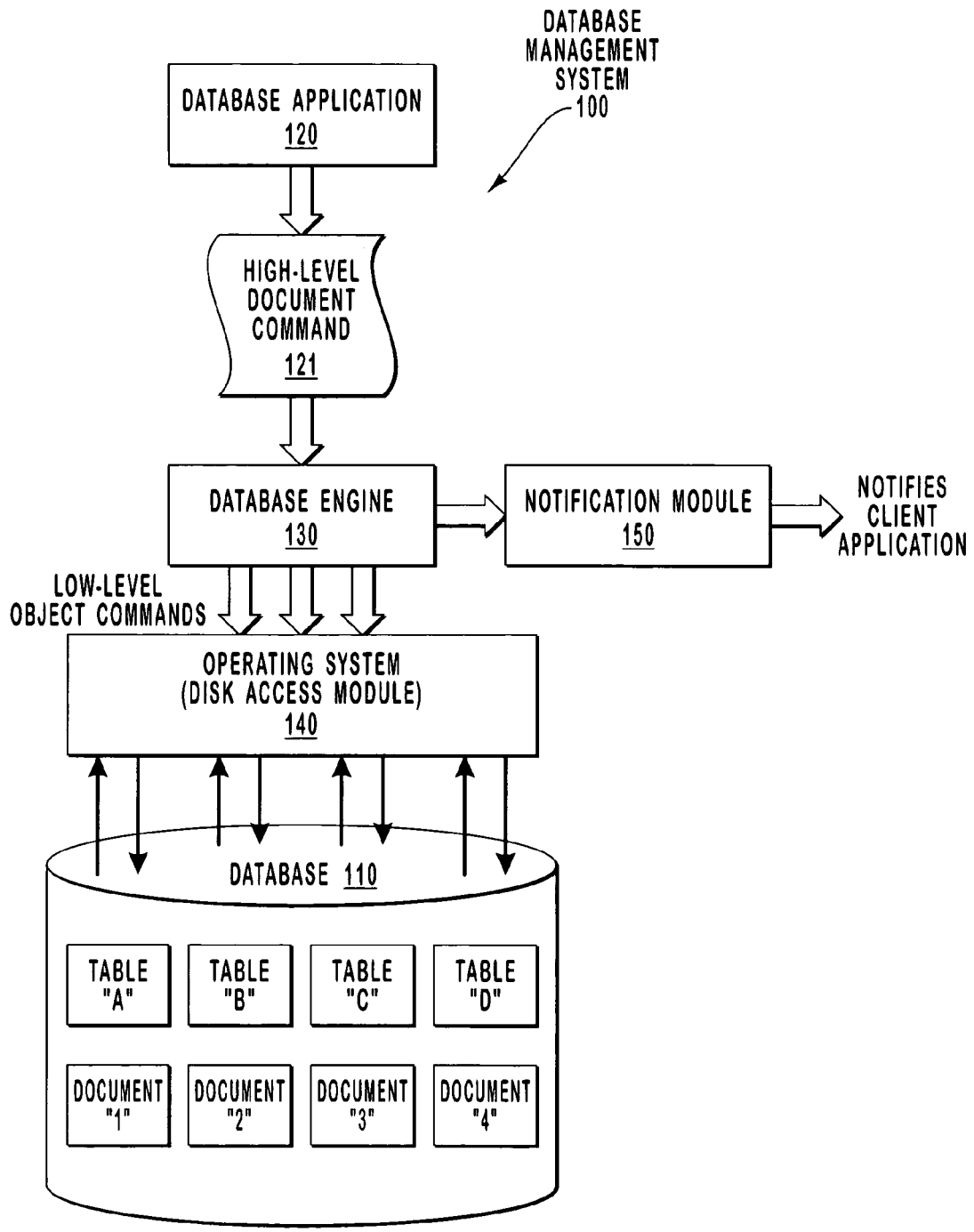
FIG. 1 illustrates a hierarchical view of a database management system in accordance with the prior art.

The present invention extends to both methods and systems for allowing a third party client application to influence how a high-level document command is implemented in a database. Appropriate third party client applications are notified when particular high-level document commands are received in the database management system. However, before implementing the high-level document command in the database, the database management system awaits for any instructions from the appropriate third party application on how the high-level document command is to be implemented.

If there are no such intervening instructions, the high-level document command is implemented in the database. If there are such intervening instructions, these intervening instructions from the third party client applications are considered in how the high-level document command is implemented. For example, the intervening instruction may be to prevent the implementation of the high-level document command entirely. It may also be to alter the way that the high-level document command is implemented. A third party client application may also have the database management system perform high-level document commands in addition to the original high-level document command. When performing additional high-level operations, all of the high-level operations may be performed atomically in a single group operation so that either all of the high-level operations in the group operation are performed, or none are performed at all.

The embodiments of the present invention may comprise a special purpose or general purpose computer including various computer hardware, as discussed in greater detail below. Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 2:
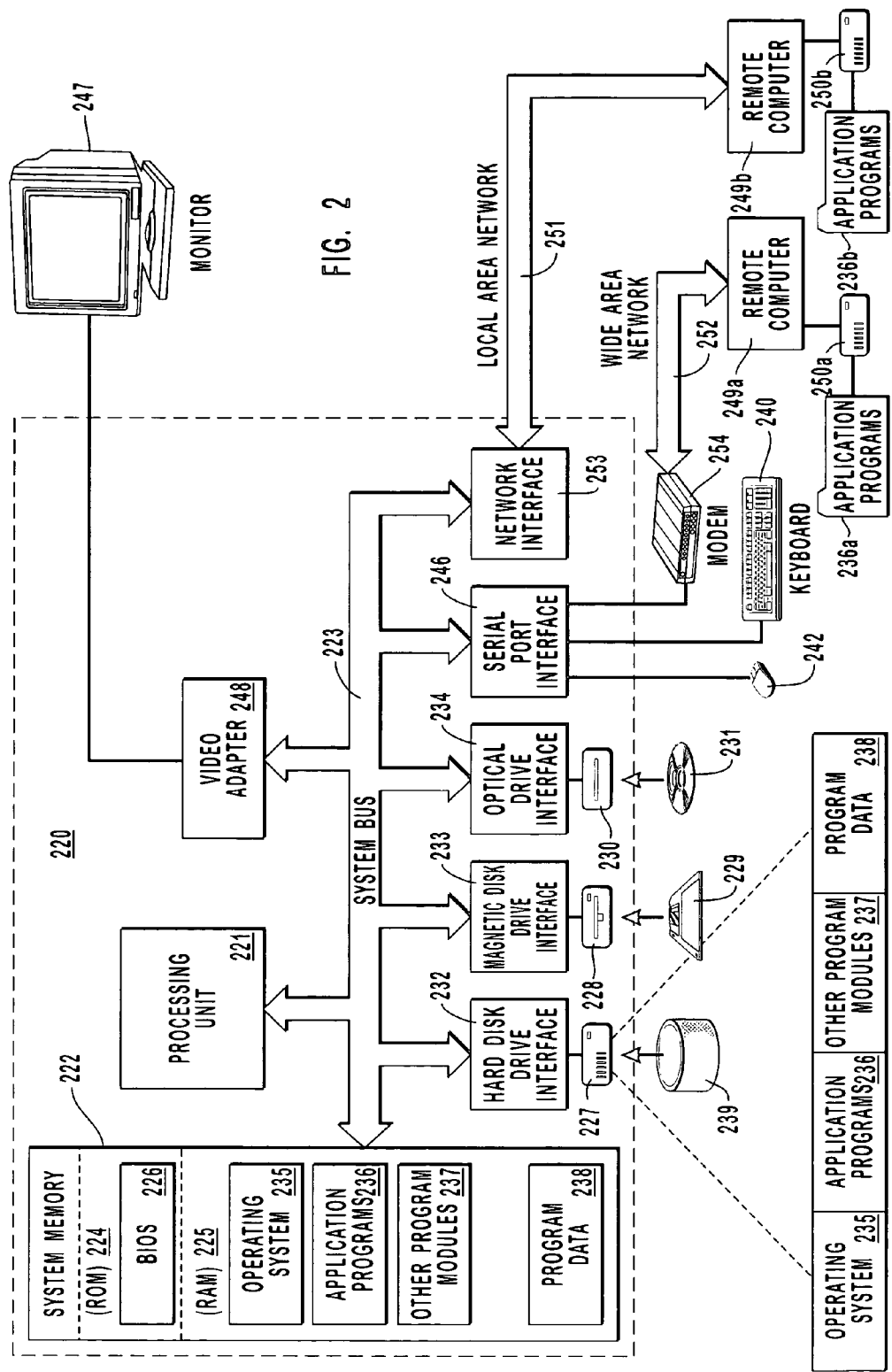
FIG. 2 illustrates an exemplary system that provides a suitable operating environment for the present invention.

FIG. 2 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 2, an exemplary system for implementing the invention includes a general purpose computing device in the form of a conventional computer 220, including a processing unit 221, a system memory 222, and a system bus 223 that couples various system components including the system memory 222 to the processing unit 221. The system bus 223 may be any of several types of bus structures including a memory bus or memory controller, a peripheral bus, and a local bus using any of a variety of bus architectures. The system memory includes read only memory (ROM) 224 and random access memory (RAM) 225. A basic input/output system (BIOS) 226, containing the basic routines that help transfer information between elements within the computer 220, such as during start-up, may be stored in ROM 224.

The computer 220 may also include a magnetic hard disk drive 227 for reading from and writing to a magnetic hard disk 239, a magnetic disk drive 228 for reading from or writing to a removable magnetic disk 229, and an optical disk drive 230 for reading from or writing to removable optical disk 231 such as a CD-ROM or other optical media. The magnetic hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide nonvolatile storage of computer-executable instructions, data structures, program modules and other data for the computer 220. Although the exemplary environment described herein employs a magnetic hard disk 239, a removable magnetic disk 229 and a removable optical disk 231, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 239, magnetic disk 229, optical disk 231, ROM 224 or RAM 225, including an operating system 235, one or more application programs 236, other program modules 237, and program data 238. A user may enter commands and information into the computer 220 through keyboard 240, pointing device 242, or other input devices (not shown), such as a microphone, joy stick, game pad, satellite dish, scanner, or the like. These and other input devices are often connected to the processing unit 221 through a serial port interface 246 coupled to system bus 223. Alternatively, the input devices may be connected by other interfaces, such as a parallel port, a game port or a universal serial bus (USB). A monitor 247 or another display device is also connected to system bus 223 via an interface, such as video adapter 248. In addition to the monitor, personal computers typically include other peripheral output devices (not shown), such as speakers and printers.

The computer 220 may operate in a networked environment using logical connections to one or more remote computers, such as remote computers 249a and 249b. Remote computers 249a and 249b may each be another personal computer, a server, a router, a network PC, a peer device or other common network node, and typically include many or all of the elements described above relative to the computer 220, although only memory storage devices 250a and 250b and their associated application programs 236a and 236b have been illustrated in FIG. 2. The logical connections depicted in FIG. 2 include a local area network (LAN) 251 and a wide area network (WAN) 252 that are presented here by way of example and not limitation. Such networking environments are commonplace in office-wide or enterprise-wide computer networks, intranets and the Internet.

When used in a LAN networking environment, the computer 220 is connected to the local network 251 through a network interface or adapter 253. When used in a WAN networking environment, the computer 220 may include a modem 254, a wireless link, or other means for establishing communications over the wide area network 252, such as the Internet. The modem 254, which may be internal or external, is connected to the system bus 223 via the serial port interface 246. In a networked environment, program modules depicted relative to the computer 220, or portions thereof, may be stored in the remote memory storage device. It will be appreciated that the network connections shown are exemplary and other means of establishing communications over wide area network 252 may be used.

Figure 3:
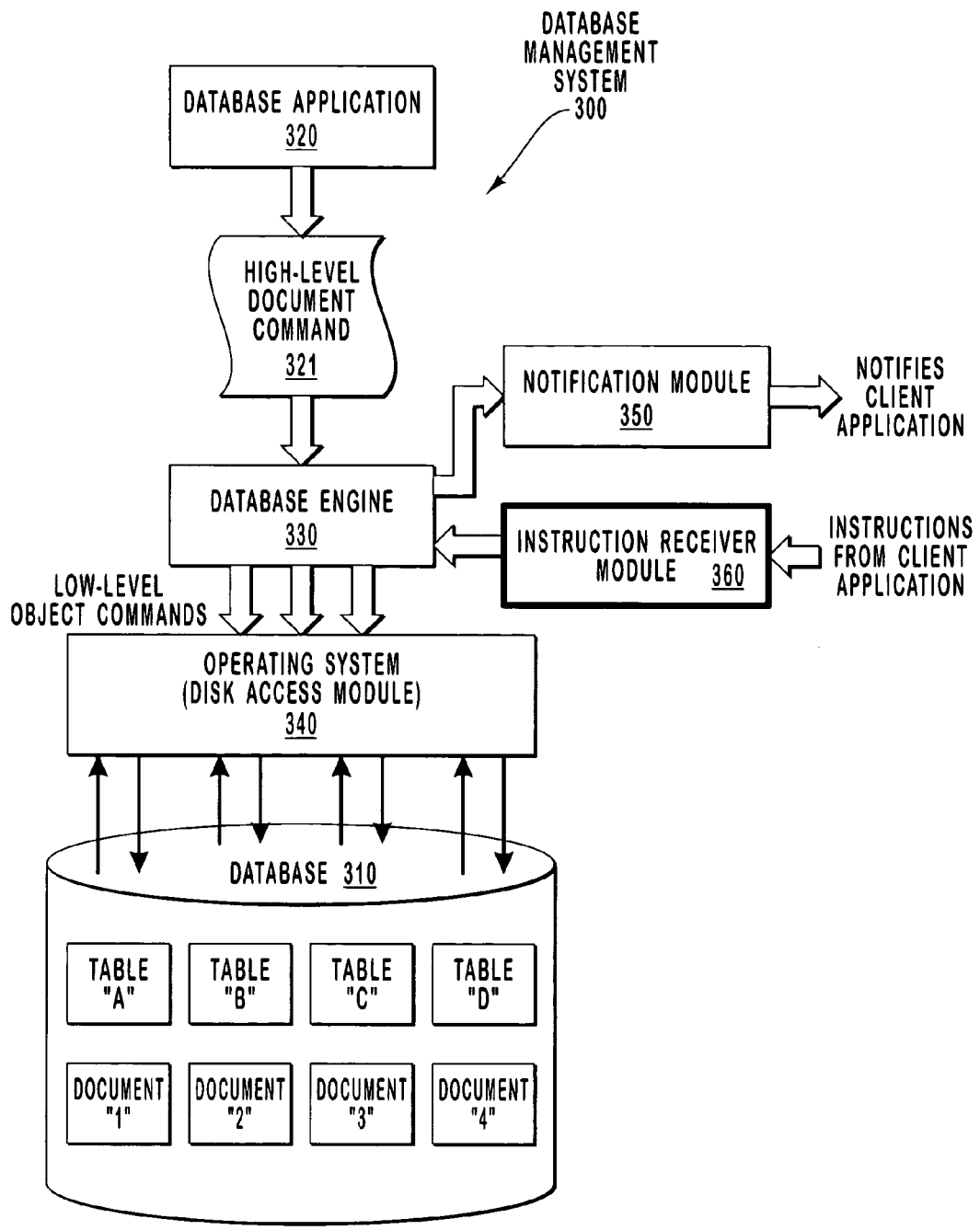
FIG. 3 illustrates a hierarchical view of a database management system in accordance with the present invention.

FIG. 3 illustrates a database management system 300 in accordance with the present invention. Although, not required, the database management system 300 may be implemented in the computing environment shown in FIG. 2. The database application 320 issues high-level document commands such as command 321. The document command may be, for example, to move, update, copy, add, or delete the document. For each high-level document command, the database management system 300 notifies, via notification module 350, the appropriate client applications(s).

However, in contrast to the prior art database management system, the database management system 300 includes a means for allowing one or more client applications to affect how the received high-level document is to be implemented, if at all, in the database. This means is illustrates in FIG. 3 as the instruction receiver module 360 which may be implemented by software, hardware, or a combination of software and hardware. The instruction receiver module may be implemented separately or perhaps by the database engine 330, the database application 320, another component of the database management system, or a combination thereof.

Figure 4:
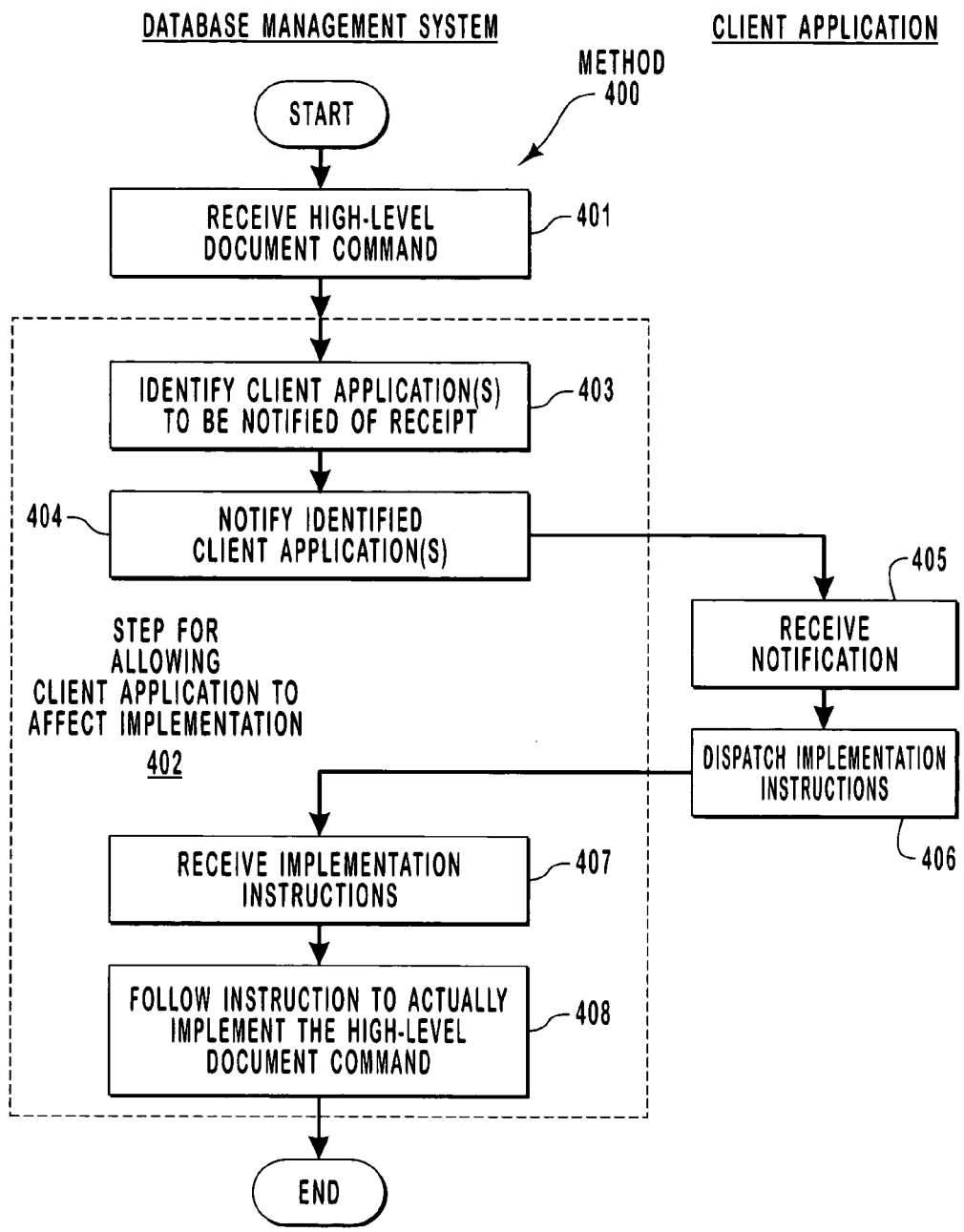
FIG. 4 illustrates a flowchart of a method for allowing a third party client application to influence how a high-level document command is implemented in the database of FIG. 3.

FIG. 4 illustrates a flowchart of a method 400 for allowing third party applications to influence the implementation of a high-level document commands in a database. Acts implemented by the database management system are listed under the column entitled "DATABASE MANAGEMENT SYSTEM" while those act performed by the client application are listed under the column entitled "CLIENT APPLICATION."

The method is initiated by the database management system receiving a high-level document command (act 401). The command is high-level in the sense that the command is for an operation to be performed on a document. The document is an entity such as an electronic mail message or a folder, which is identifiable at the high-level of the client application that is using the database management system. Such high-level applications typically have no knowledge of the tables in the database or how such tables would be altered to implement the high-level document command. Thus, tables in databases are not considered to be "documents" in this description and in the claims.

After the database management system receives the high-level command, but before implementing the high-level command, the database management system allows third party client applications to affect how the high-level document command is implemented in the database. Accordingly, embodiments within the scope of the present invention include the database management system implementing a step for allowing one or more client applications to affect how the high-level document command is implemented, if at all (step 402). In the example shown in FIG. 4, this step includes acts 403, 404, 407 and 408.

For the received high-level document command, the database management system identifies any client applications that are to be notified when the database management system receives the high-level document command (act 403). These client applications may be identified by being client applications that are notified by default when the database management system receives a high-level document command meeting specified criteria. Alternatively or in addition, client applications may be identified by having a subscription for notifications to occur when the database management system receives high-level document commands meeting specified criteria.

Once identified, the client applications are notified of the receipt of the high-level document command (act 404). This may be performed via messaging over a network if the database management system and the client application are located on different machines. Also, this may be performed by the notification being passed through a function call as when the database management system and the client application are located on the same machine.

The client application then receives the notification (act 405) and then dispatches instructions back to the database management system (act 406) on how to implement the high-level document command. For example, the client application may instruct the prevention of the implementation altogether, or perhaps how the high-level document command is implemented, or perhaps even what additional high-level document commands are to perform in addition to the received high-level document command. The database management system then receives these implementation instructions (act 407) and then follows the instructions when actually implementing the high-level document command (act 408).

The implementation instruction may be prevented from being implemented altogether if so instructed. For example, suppose that a client application is to be notified when a high-level document command is received that is for adding a new electronic mail message into an electronic inbox, the electronic mail message containing certain offensive words. Now suppose that such a high-level document command is, in fact, received at the database management system. The client application will thus be notified. The client application may dispatch instructions to prevent the high-level document command from being implemented at all. The user may have configured the client application to so instruct the database management system to prevent implementation in this case so as to avoid having to encounter offensive words.

The implementation instruction may be for changing the way that the high-level document command is implemented. For example, instead of preventing the addition of electronic mail messages that contain certain offensive words, the user may have configured the client application to instruct the database management system to type over the offensive words with random alphanumeric text before adding the electronic mail message into the inbox.

The implementation instruction may also be to perform one or more high-level document commands in addition to the received high-level document command. For example, the user may configure the client application to instruct the database management system so that any electronic mail message being marked as "urgent" are not only added to the user's inbox, but also are copied to the in-box of the user's staff, and the in-box of the user's supervisor as well.

When performing additional high-level document commands over and above the received high-level document commands, the document commands may be implemented as a "group operation" in which all of the document commands are implemented in a single transaction, all of the high-level document command being implemented, or none at all. Group operations are described in co-pending United States application serial number [NOT YET ASSIGNED—ATTORNEY DOCKET NUMBER 13768.171], filed on the same date herewith, and entitled "METHODS AND SYSTEMS FOR PERFORMING HIGH-LEVEL GROUP OPERATIONS IN A DATABASE MANAGEMENT SYSTEM", which is incorporated herein by reference in its entirety.

As described above, the principles of the present invention allow for third party client applications to influence how a high-level document command is to be implemented. This give more control to client applications that desire to tailor how certain high-level document commands are to be implemented.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A computer program product for use in a database management system which includes a database engine which accesses and updates objects in a database, the database engine receiving high-level document commands, each high-level document command for performing an operation on a document associated with a plurality of tables in the database, the computer program product comprising:

one or more computer-readable media having computer-executable instructions for implementing a method for allowing client applications to control how a particular high-level document command is implemented in the database, and wherein the method comprises:

an act of receiving a single high-level document command meeting certain criteria the single high-level document command including one or more operations to be performed on a document comprising one of an e-mail document and a folder having an e-mail document, resulting in a number of table level commands being executed and resulting in one or more database tables being updated; and a step for allowing one or more client applications to determine whether the received single high-level document command is to be implemented and to affect how the received single high-level document command is to be implemented in the database, the step for allowing one or more client applications to affect how the single high-level document command is to be implemented, including:

an act of identifying one or more client applications to be notified of the receipt of high-level document commands meeting certain criteria, wherein identifying the one or more client applications to be notified of the receipt of high-level document commands includes having the one or more client applications subscribe for notifications of the receipt of high-level document commands meeting the certain criteria, and an act of notifying the one or more identified client applications a high-level document command meeting the certain criteria has been received prior to implementing the single high-level document command and solely in response to receiving the single high-level document command.

2. The computer program product in accordance with claim 1, wherein the step for allowing one or more client applications to affect how the single high-level document command is to be implemented further includes:
an act of receiving instructions from the one or more client applications on how to affect the implementation of the single high-level document command in the database; and
an act of altering one or more operations included in the single high-level document command according to the received instructions when implementing the high-level document command.

\* \* \* \* \*